(12) United States Patent
Zhao et al.

(10) Patent No.: US 11,933,617 B2
(45) Date of Patent: Mar. 19, 2024

(54) SYSTEMS AND METHODS FOR AUTONOMOUS ROUTE NAVIGATION

(71) Applicants: TuSimple, Inc., San Diego, CA (US); Beijing Tusen Zhitu Technology Co., Ltd., Beijing (CN)

(72) Inventors: Yufei Zhao, San Diego, CA (US); Fan Mo, Beijing (CN); Xuren Zhou, San Diego, CA (US)

(73) Assignees: TuSimple, Inc., San Diego, CA (US); Beijing Tusen Zhitu Technology Co., Ltd., Beijing (CN)

( * ) Notice: Subject to any disclaimer, the term of this patent is extended or adjusted under 35 U.S.C. 154(b) by 565 days.

(21) Appl. No.: 16/987,175

(22) Filed: Aug. 6, 2020

(65) Prior Publication Data

US 2022/0026224 A1 Jan. 27, 2022
US 2023/0093772 A9 Mar. 23, 2023

(30) Foreign Application Priority Data

Jul. 21, 2020 (CN) .......................... 202010705822.5

(51) Int. Cl.
*G01C 21/34* (2006.01)
*G05D 1/00* (2006.01)
*G05D 1/02* (2020.01)

(52) U.S. Cl.
CPC ....... *G01C 21/3446* (2013.01); *G05D 1/0219* (2013.01); *G05D 1/0285* (2013.01)

(58) Field of Classification Search
CPC . G01C 21/3446; G05D 1/0219; G05D 1/0285
See application file for complete search history.

(56) References Cited

U.S. PATENT DOCUMENTS

| 10,267,634 | B2 | 4/2019 | Chen et al. | |
| 11,199,841 | B1* | 12/2021 | Van Den Berg | ... G01C 21/3453 |
| 2016/0070265 | A1* | 3/2016 | Liu | ........................ B64C 39/024 |
| | | | | 701/25 |
| 2018/0188743 | A1* | 7/2018 | Wheeler | .............. G05D 1/0276 |
| 2018/0267548 | A1* | 9/2018 | Sumioka | .............. G05D 1/0214 |

(Continued)

FOREIGN PATENT DOCUMENTS

KR 10-2019-0101925 9/2019

*Primary Examiner* — Amelia Vorce
(74) *Attorney, Agent, or Firm* — Knobbe, Martens, Olson & Bear, LLP (57) ABSTRACT

Systems and methods for autonomous lane level navigation are disclosed. In one aspect, a control system for an autonomous vehicle includes a processor and a computer-readable memory configured to cause the processor to receive a partial high-definition (HD) map that defines a plurality of lane segments that together represent one or more lanes of a roadway, the partial HD map including at least a current lane segment. The processor is also configured to generate auxiliary global information for each of the lane segments in the partial HD map. The processor is further configured to generate a subgraph including a plurality of possible routes between the current lane segment and the destination lane segment using the partial HD map and the auxiliary global information, select one of the possible routes for navigation based on the auxiliary global information, and generate lane level navigation information based on the selected route.

20 Claims, 4 Drawing Sheets

(56) References Cited

U.S. PATENT DOCUMENTS

| | | | |
|---|---|---|---|
| 2019/0120640 A1 | 4/2019 | Ho et al. | |
| 2019/0130182 A1* | 5/2019 | Zang | G06V 20/182 |
| 2020/0182633 A1* | 6/2020 | Liu | G01C 21/3658 |
| 2021/0004012 A1* | 1/2021 | Marchetti-Bowick | G01C 21/3446 |
| 2021/0004363 A1* | 1/2021 | Bailly | G06T 17/05 |
| 2021/0331670 A1* | 10/2021 | Valchok | B60W 30/0956 |
| 2022/0315000 A1* | 10/2022 | Wray | G05D 1/0212 |
| 2022/0381569 A1* | 12/2022 | Khan | G01C 21/3446 |

* cited by examiner

SYSTEMS AND METHODS FOR AUTONOMOUS ROUTE NAVIGATION

CROSS-REFERENCE TO RELATED APPLICATION(S)

This application claims the benefit under 35 U.S.C. § 119 of Chinese Application No. 202010705822.5, filed Jul. 21, 2020, which is herein incorporated by reference in its entirety.

BACKGROUND

Technological Field

The described technology generally relates to systems and methods for autonomous driving, and more particularly, to autonomous lane level navigation.

Description of the Related Technology

In autonomous driving systems, the accurate perception and prediction of the surrounding driving environment and traffic participants are crucial for making correct and safe decisions for control of the autonomous or host vehicle. During the autonomous driving of the autonomous vehicle, the system may select the route to be navigated from a large number of possible routes. The routes can be between the autonomous vehicle's current location and a destination. It can be important to take into account a wide variety of factors, such as the maneuvers (e.g., lane change, merger, etc.) which will be required to follow each of the possible routes in selecting the route to be navigated.

SUMMARY OF CERTAIN INVENTIVE ASPECTS

One inventive aspect is a control system for an autonomous vehicle, comprising: a processor; and a computer-readable memory in communication with the processor and having stored thereon computer-executable instructions to cause the processor to: receive at least a partial high-definition (HD) map that defines a plurality of lane segments that together represent one or more lanes of a roadway, the partial HD map including at least a current lane segment, and the plurality of lane segments connecting the current lane segment to a destination lane segment, generate auxiliary global information for each of the lane segments in the partial HD map, generate a subgraph including a plurality of possible routes between the current lane segment and the destination lane segment using the partial HD map and the auxiliary global information, select one of the possible routes for navigation based on the auxiliary global information, and generate lane level navigation information based on the selected route.

In some embodiments, the memory further has stored thereon computer-executable instructions to cause the processor to: generate a plurality of nodes, each of the nodes corresponding to one of the lane segments in the partial HD map, generate a plurality of edges, each of the edges connecting a pair of the nodes, and determine a cost value for each of the edges based on the auxiliary global information, wherein the cost value is representative of a time to traverse the pair of nodes and/or a difficulty in maneuvering the autonomous vehicle between the pair of nodes.

In certain embodiments, the control system further comprises: one or more vehicle sensors, wherein the memory further has stored thereon computer-executable instructions to cause the processor to: receive data from the one or more vehicle sensors indicative of conditions of the lane segments, and update the cost value for at least one of the edges based on the data received from the one or more vehicle sensors.

In further embodiments, the control system further comprises: determine a route cost value for each of the possible routes based on a sum of the cost values the edges in the corresponding route, wherein the selecting one of the possible routes for navigation comprises using a search algorithm to select the one of the possible routes having a lowest route cost value.

In some embodiments, the memory further has stored thereon computer-executable instructions to cause the processor to: receive an HD map including the partial HD map, select a portion of the HD map as the partial HD map including the current lane segment such that the partial HD map is less than a predetermined size, wherein the subgraph is generated based on the lane segments within the partial HD map and lane segments outside of the partial HD map are excluded from the subgraph.

In certain embodiments, the memory further has stored thereon computer-executable instructions to cause the processor to: determine a route cost value for each of the possible routes based on a sum of the cost values the edges in the corresponding route and the auxiliary global information between an end lane segment of the corresponding route and the destination lane segment.

In further embodiments, the control system further comprises: a vehicle drive subsystem configured to control autonomous navigation of the autonomous vehicle based on the lane level navigation data.

In yet further embodiments, the lane level navigation information comprises the auxiliary global information including an estimated time of arrival (ETA) value for the selected one of the possible routes for navigation and driving maneuvers for the autonomous vehicle to follow the selected route.

Another aspect is a non-transitory computer readable storage medium having stored thereon instructions that, when executed, cause at least one computing device to: receive a partial high-definition (HD) map that defines a plurality of lane segments that together represent one or more lanes of a roadway, the HD map including at least a current lane segment, and the plurality of lane segments connecting the current lane segment to a destination lane segment; generate auxiliary global information for each of the lane segments in the partial HD map; generate a subgraph including a plurality of possible routes between the current lane segment and the destination lane segment using the partial HD map and the auxiliary global information; select one of the possible routes for navigation based on the auxiliary global information; and generate lane level navigation information based on the selected route.

In some embodiments, the non-transitory computer readable storage medium further has stored thereon instructions that, when executed, cause at least one computing device to: generate a plurality of nodes, each of the nodes corresponding to one of the lane segments in the partial HD map, generate a plurality of edges, each of the edges connecting a pair of the nodes, and determine a cost value for each of the edges based on the auxiliary global information.

In certain embodiments, the cost value for each of the edges represents an amount of time involved in driving between the pair of nodes connected to the edge.

In further embodiments, the non-transitory computer readable storage medium further has stored thereon instructions that, when executed, cause at least one computing device to: for each of the edges, determine the amount of time involved in driving between the pair of nodes connected to the edge based on the distance between the pair of nodes and a speed limit associated with the lane segments corresponding to the pair of nodes.

In yet further embodiments, the cost value for each of the edges represents a difficulty involved in driving between the pair of nodes.

In some embodiments, the non-transitory computer readable storage medium further has stored thereon instructions that, when executed, cause at least one computing device to: determine the difficulty involved in driving between the pair of nodes based on a type of maneuver for traversing the lane segments corresponding to the pair of nodes.

In certain embodiments, the type of maneuver comprises at least one of the following: a lane change, a merge, a lane split, and traversing an intersection.

In further embodiments, the non-transitory computer readable storage medium further has stored thereon instructions that, when executed, cause at least one computing device to: determine a difficulty value for each of the possible routes between the current lane segment and the destination lane segment based on the difficulty involved in driving between the pair of nodes for the edges in each of the possible routes, wherein the selection of one of the possible routes for navigation is further based on the difficulty values.

Yet another aspect is a method for generate lane level navigation information for autonomous navigation, comprising: receiving a partial high-definition (HD) map that defines a plurality of lane segments that together represent one or more lanes of a roadway, the partial HD map including at least a current lane segment and a destination lane segment; generate auxiliary global information for each of the lane segments in the partial HD map; generating a subgraph including a plurality of possible routes between the current lane segment and the destination lane segment using the partial HD map the auxiliary global information; selecting one of the possible routes for navigation based on the auxiliary global information; and generating lane level navigation information based on the selected route.

In some embodiments, the method further comprises: traversing the subgraph using a search algorithm to determine a cost value for each of the possible routes, wherein the selecting one of the possible routes for navigation comprises selecting the one of the possible routes having a lowest associated cost value.

In certain embodiments, the search algorithm comprises an A* algorithm or a modified version of the A* algorithm.

In further embodiments, the search algorithm comprises Dijkstra's algorithm or a modified version of the Dijkstra's algorithm.

DETAILED DESCRIPTION OF CERTAIN INVENTIVE EMBODIMENTS

Introduction to In-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for detecting trailer angle for an articulated vehicle are described herein. An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
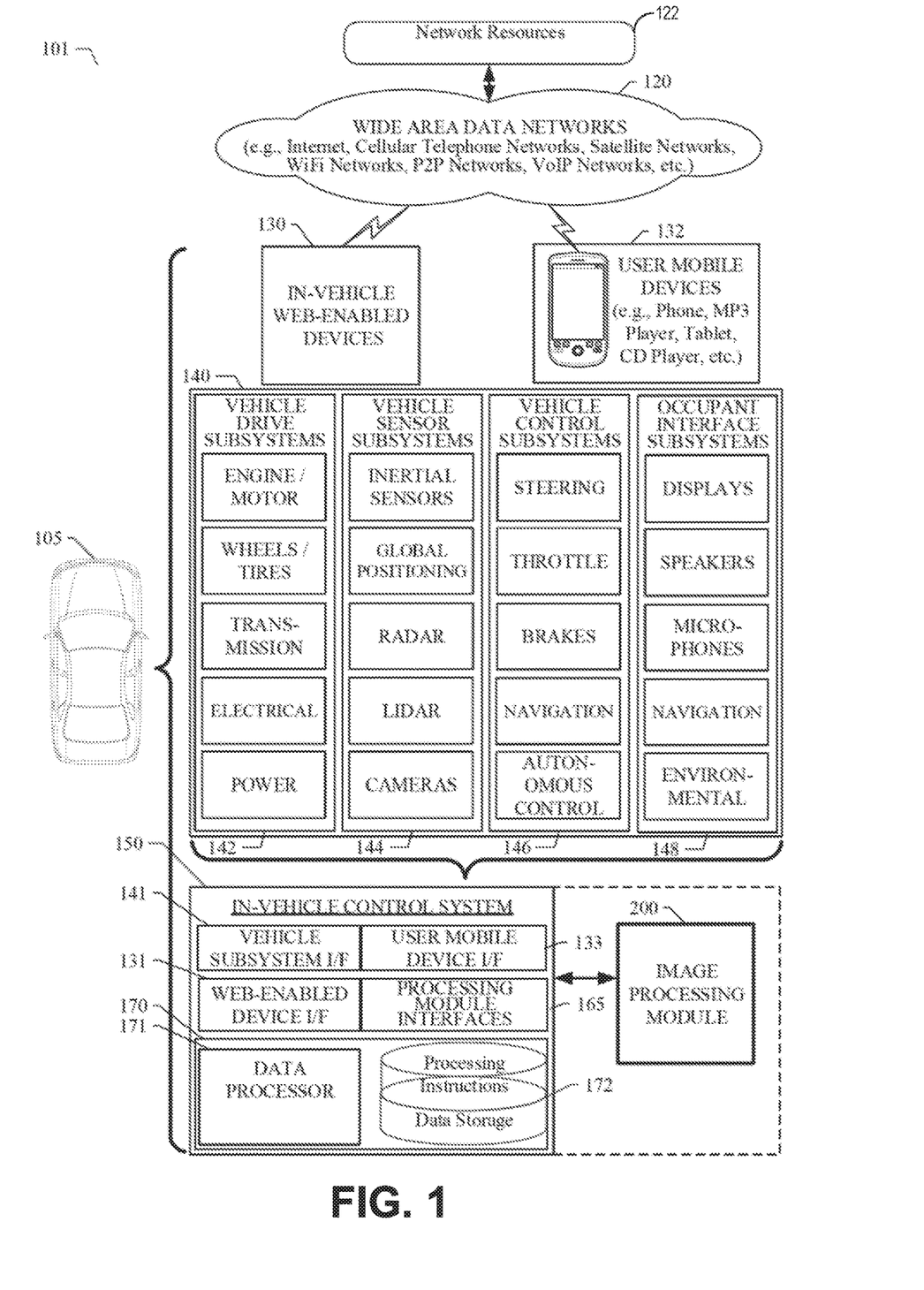
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can reside in a user's vehicle 105. A vehicle subsystem interface 141 is provided to facilitate data communication between the in-vehicle control system 150 and the plurality of vehicle subsystems 140. The in-vehicle control system 150 can include a data processor 171 configured to execute the image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

Figure 3:
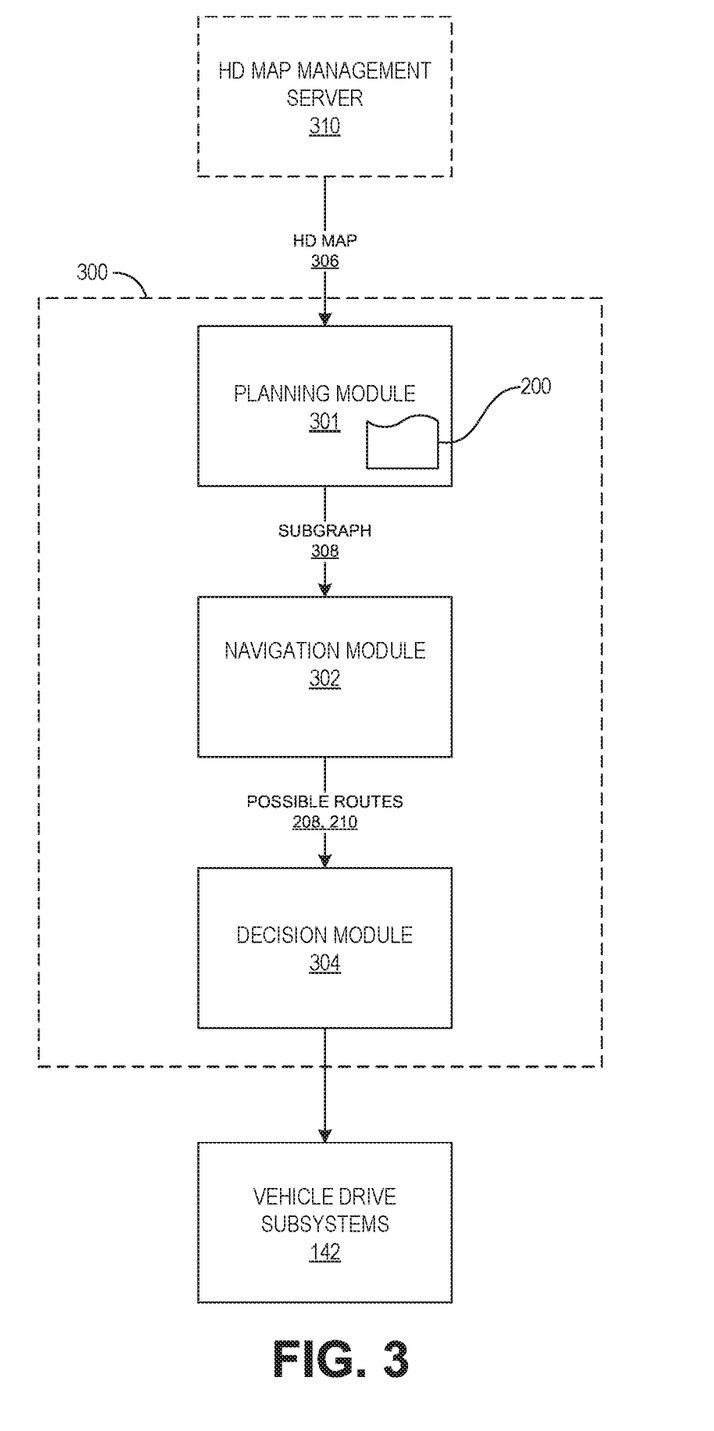
FIG. 3 is a block diagram of a navigation subsystem in accordance with aspects of this disclosure.

Although not illustrated in FIG. 1, the in-vehicle control system 150 and/or the vehicle subsystems 140 may include a navigation subsystem 300 (e.g., as shown in FIG. 3) configured to provide navigation instructions to the plurality of vehicle subsystems 104. Further details regarding the subsystem 300 are provided below.

The in-vehicle control system 150 can be configured to receive or transmit data to/from a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The term wheel may generally refer to a structure comprising a rim configured to be fixedly attached to a tire, which is typically formed of rubber. Optionally, a wheel may include a hubcap attached to an outer surface of the rim or the tire may be exposed to the environment without the inclusion of a hubcap.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105.

The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

Figure 2:
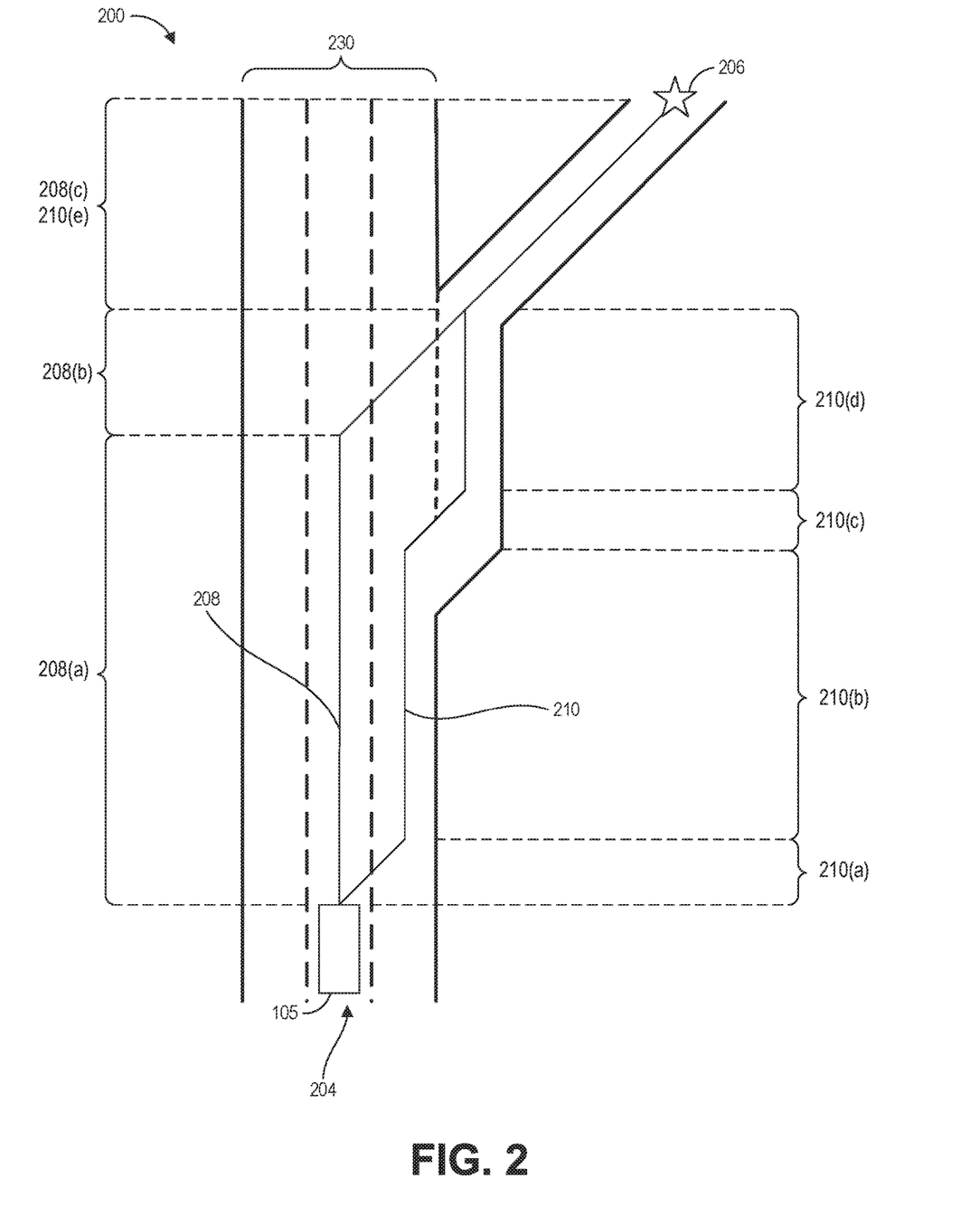
FIG. 2 is a simplified diagram of a partial high definition (HD) map of a roadway which can be used to navigate an autonomous vehicle from a current location to a destination.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices (e.g., an optical sensor 210 as shown in FIG. 2). The optical sensor may be embodied as a LiDAR detector or a camera (e.g., a conventional visible wavelength camera). The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit can be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide capabilities for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Systems and Methods for Autonomous Navigation

In the various example embodiments disclosed herein, a system and method are provided for the lane level navigation of an autonomous vehicle 105. Embodiments of the autonomous vehicle 105 include a semi-truck having a tractor and at least one trailer, an articulated bus, a train, a passenger car, etc.

A traditional navigation map (e.g., Google maps) can provide navigation information for a given route, but does not provide sufficiently accurate lane level information to be used for autonomous driving. For example, the route information provided by traditional navigation map technology does not have sufficiently comprehensive and accurate lane level information for the autonomous vehicle 105 to perform lane level navigation. As used herein, lane level navigation generally refers to selecting a route for navigation with the scale of the navigation occurring at the lane level. For example, lane level navigation can involve providing navigation instructions as to which lane to navigate the autonomous vehicle 105, in contrast to (i) road level navigation which may not specify a particulate lane of a roadway to navigate the autonomous vehicle or (ii) intra-lane navigation which may specify a position within a lane to navigate. Due to the lack of lane level data and/or inaccuracies of traditional navigation map technology, it may not be possible to perform lane level navigation using traditional navigation map technology alone.

High-definition (HD) maps 306 generally refer to a category of navigational maps having sufficient precision for lane level navigation. For example, HD maps 306 can define properties or characteristics of the lanes for all routes in the HD map 306 with high enough accuracy to be used for lane level navigation. Due to the amount of data required to achieve this level of accuracy, HD maps 306 may be too large in size to be fully loaded into local memory. Accordingly, aspects of this disclosure relate to lane level navigation which can be performed on a partial HD map 200 so that the navigation subsystem 300 can efficiently search the partial HD map 200 to select a lane level route for navigation while the autonomous vehicle 105 is driving. As used herein, the term "dynamic" may be used to refer to actions which are performed during autonomous driving (e.g., dynamic lane level navigation), as opposed to static actions which can be performed prior to autonomous driving (e.g., generating the partial HD map 200 data).

FIG. 2 is a simplified diagram of the partial HD map 200 of a roadway 230 which can be used to navigate an autonomous vehicle 105 from a current location 204 to a destination 206. In some embodiments, the partial HD map 200 used for lane level navigation will be larger than the illustrated partial HD map 200, which has been simplified for ease of description. With reference to FIG. 2, the partial HD map 200 includes the current location 204 of an autonomous vehicle 105, the destination 206, and a plurality of possible routes 208, 210 between the current location 204 and the destination 206.

The partial HD map 200 can be divided into a number of individual lane segments 208(a)-(c) and 210(a)-(e) connected together to represent the lanes of the roadway 230. That is, each lane of the roadway can be divided into a plurality of lane segments 208(a)-(c) and 210(a)-(e), each lane segment having associated specific properties or characteristics that can be used in selecting a route for navigation. Depending on the embodiment, each lane segment 208(a)-(c) and 210(a)-(e) may be a standard length along a corresponding lane, or may have a variable length. Although the lane segments 208(a)-(c) and 210(a)-(e) making up the routes 208, 210 are illustrated in FIG. 2, the lanes of the roadway 230 that do not forma route from the current location 204 to the destination 206 can also be represented as lane segments within the partial HD map 200.

Each lane segment 208(a)-(c) and 210(a)-(e) can include data representative of the lane segment. For example, the length of the lane segment, the speed limit of the lane segment, the lane segment type (e.g., whether the lane segment is part of a merge, a lane split, whether the lane segment is adjacent to other lane segments, etc.), etc. The lane segments can also include additional data such as whether a road sign is placed adjacent to the lane segment (and the information conveyed by the road sign), lane closures (e.g., due to construction), missing lane markings (e.g., due to recent pavement or wear), etc.

A plurality of adjacent lane segments 208(a)-(c) and 210(a)-(e) (e.g., the autonomous vehicle 105 may be able to drive directly between adjacent lane segments) can be connected together between the current location 204 of the autonomous vehicle 105 and the destination 206 to construct the possible routes 208 and 210. Although only two possible routes 208 and 210 are illustrated for the sake of simplicity, in general there may be a large number of possible lane level routes between the current location 204 and the destination 206. Aspects of this disclosure relate to systems and methods for at least initially selecting one of the possible routes 208 and 210 for autonomous navigation. In certain embodiments, the systems and methods further select new or updated routes after the initial selection and/or after beginning navigation based on the initial selected route. That is, the subsystem 300 can continuously select new or updated routes as the current location 204 of the autonomous vehicle 105, the traffic conditions, and/or other considerations change.

FIG. 3 is a block diagram of the navigation subsystem 300 in accordance with aspects of this disclosure. In particular, the navigation subsystem 300 includes a planning module 301, a navigation module 302, and a decision module 304. The planning module 301 can receive an HD map 306 from an HD map management server 310 and generate the partial HD map 200 based on the received HD map 306. However, in other embodiments, the planning module 301 may receive the partial HD map 200 directly from the HD map management server 310. The planning module 301 may generate a subgraph 308 based on the partial HD map 200 and provide the subgraph 308 to the navigation module 302. The navigation module 302 receives the subgraph 308 from the planning module 301 and generates a list of possible routes 208, 210 for navigation between the current location 204 of the autonomous vehicle 105 and the destination 206. The decision module 304 can select one of the possible routes 208, 210 for navigation based on the list of possible routes 208, 210 received from the navigation module 302.

The navigation subsystem 300 may provide the selected route 208, 210 to the vehicle drive subsystem 142 (as shown in FIG. 1) such that the autonomous vehicle 105 can use the selected route 208, 210 to provide powered motion for the autonomous vehicle 105 in order to follow the selected route 208, 210. In some embodiments, each of the navigation module 302 and the decision module 304 may be implemented within the vehicle control system 146 of FIG. 1. For example, the navigation module 302 may be implemented as part of the navigation unit of the vehicle control system 146 and the decision module 304 may be implemented as part of the autonomous control unit of the vehicle control system 146. However, other embodiments are possible. For example, the navigation module 302 and the decision module 304 can be implemented as separate modules executed by the data processor 171.

Figure 4:
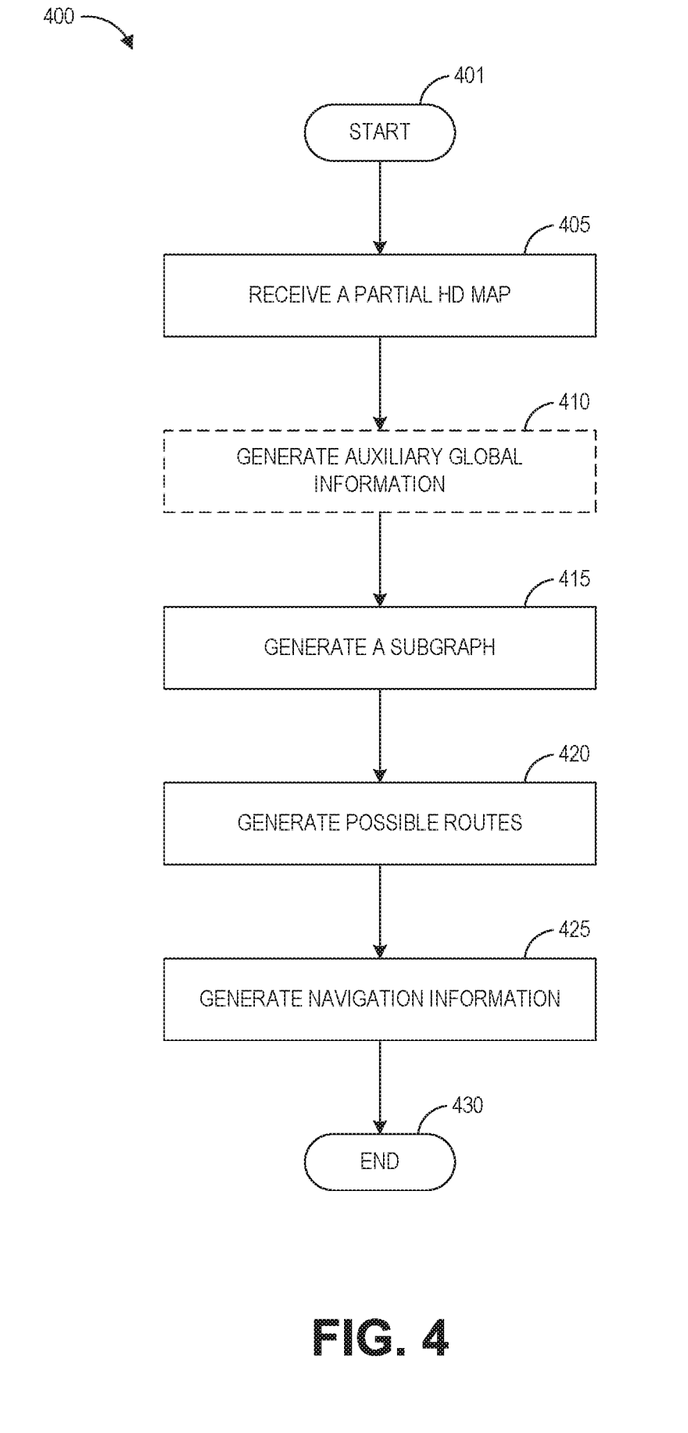
FIG. 4 is a flowchart illustrating an example method to navigate the autonomous vehicle that can be performed by the navigation subsystem of FIG. 3 in accordance with aspects of this disclosure.

FIG. 4 is a flowchart illustrating an example method 400 to navigate the autonomous vehicle that can be performed by the navigation subsystem 300 of FIG. 3 in accordance with aspects of this disclosure. In certain embodiments, the method 400 may be performed at least in part by the navigation module 302 of FIG. 3, when executed by a processor. However, one or more blocks of the method 400 can be performed by other components of an autonomous vehicle 105, for example, by the vehicle control system 146.

The method 400 begins at block 401. At block 405, the planning module 301 receives an HD map 306. For example, the planning module 301 can receive the HD map 306 from the HD map management server 310 and generate a partial HD map 200 based on the HD map 306. In other embodiments, the planning module 301 can receive the HD map 306 from data storage, such as from the data storage device 172. In other embodiments, the planning module can receive the partial HD map 200 from the HD map management server 310. The HD map management server 310 can generate auxiliary global information when generating the HD map 306. Thus, the navigation module 302 may also receive the auxiliary global information from the map management server 310 along with the HD map 306.

At optional block 410, the planning module 301 can generate auxiliary global information based on the received HD map 306. For example, in embodiments where the HD map management server 310 does not generate the auxiliary global information, the auxiliary global information may be generated by the planning module 301. The auxiliary global information may include an expected shortest time (also referred to as an estimated time of arrival or "ETA") from each lane segment defined in the HD map 306 to a destination lane segment. In some embodiments, the auxiliary global information may include other information relevant to selecting a navigation route, such as, the shortest distance between each of the lane segments and the destination lane segment, an estimated amount of fuel to be used in navigating from each of the lane segments to the destination lane segment, the location of nearby ramps or intersections, or any other metric which can be used to distinguish between lane segments for route selection. For example, the planning module 301 can determine auxiliary global information (e.g., an ETA value) for each lane segment 208(a)-(c), 210(a)-(e) included in the partial HD map 200. As previously discussed, in other embodiments, the auxiliary global information can be generated by the HD map management server 310 and provided to the planning module 301 along with the HD map 306 or partial HD map 200.

Although multiple routes 208, 210 may be possible between a lane segment and a destination, the ETA value or other auxiliary global information between the two points (e.g., the lane segment and the destination) can be calculated as a single value. In certain embodiments, the ETA value can be calculated as the expected shortest time (given multiple possible routes) from a given lane segment to the destination. The planning module 301 or HD map management server 310 can calculate the ETA value based on the possible routes between the given lane segment and the destination, the distance between the given lane segment and the destination, and/or the speed limits defined for each lane segment along the possible routes between the given lane segment and the destination. In certain embodiments, the planning module 301 or HD map management server 310 can calculate the ETA value using the possible route, distance, and speed limit data without reliance on other data.

At block 415, the planning module 301 can generate the subgraph 308 representing all of the possible routes between the current location 204 of the autonomous vehicle 105 and the destination 206. In some embodiments, this may involve the planning module 301 selecting a portion of the HD map 306 as the partial HD map 200 from which to generate the subgraph 308. For example, the size of the HD map 306 including all possible routes 208, 210 between the current location 105 of the autonomous vehicle 105 and the destination 206 may be too large to fit into local memory and/or to dynamically generate navigation information fast enough to be usable for autonomous navigation. Thus, the planning module 301 may select a portion of the HD map 306 as the partial HD map 200 for further processing. In some embodiments, the portion of the HD map 306 selected as the partial HD map 200 can be restricted to a natural bottleneck for each of the routes 208, 210 to the destination 206. For example, with reference to FIG. 2, if the autonomous vehicle 105 must take the next exit in order to reach the destination 206, the planning module 301 can select all possible routes 208, 210 which can reach the next exit as the partial HD map 200.

In other embodiments, the planning module 301 can determine the partial HD map 200 based on the maximum distance ahead of the autonomous vehicle 105 that the autonomous vehicle 105 can perceive additional information. For example, the range of the vehicle sensors (e.g., radar, lidar, cameras, etc.) may only provide information regarding the current conditions of the route up to a certain distance ahead of the autonomous vehicle 105. Thus, the planning module 301 can select the partial HD map 200 based on the distance of data available from the vehicle sensors, which may include a specified distance further and/or closer than the vehicle sensors can provide data. In yet other embodiments, the planning module 301 can select the partial HD map 200 based on other considerations, such as a predetermined size of the partial HD map 200 that can be stored in local memory. In still yet other embodiments, the partial HD map 200 can be received directly from the HD map management server 310.

The planning module 301 can generate the subgraph 308 which may be representative of all of the possible routes 208, 210 between the current location 204 of the autonomous vehicle 105 and the destination 206 with lane level data for lane segments 208(*a*)-(*c*), 210(*a*)-(*e*) within the partial HD map 200. In certain embodiments, each lane segment can form a node, with the edges between nodes reflective of a cost value to drive the autonomous vehicle 105 between the two lane segments (e.g., the two nodes). The cost value may reflect a number of different considerations regarding the time and/or difficulty involved in driving between the two lane segments, including the speed limit(s) associated with the lane segments, any required maneuvers for traversing between the lane segments (e.g., a lane change, a merge, lane split, traversing an intersection, etc.).

At block 425, the navigation module 302 can determine a plurality of possible routes 208, 210 between the current location 204 of the autonomous vehicle 105 and the destination 206 using the subgraph 308 received from the planning module 301. For example, the navigation module 302 may traverse the subgraph 308 to generate the possible routes 208, 210 using the auxiliary global information. The navigation module 302 may also use the cost values associated with the nodes in the subgraph to determine a difficulty value associated with the maneuvers required to follow a given route 208, 210. For example, one route 208, 210 may involve a plurality of lane changes in a short distance for which the navigation module 302 may assign a relatively higher difficultly value. In another example, another route 208, 210 may involve a greater number of exits, for which the navigation module 302 may assign a higher difficulty value than a route 208, 210 with fewer exits. Thus, the navigation module 302 can determine a difficulty value for each of the possible routes 208, 210 based on the type and number of maneuvers required for the autonomous vehicle to follow the respective possible routes 208, 210.

In generating the possible routes 208, 210 and difficulty values, the navigation module can use a search algorithm to traverse the subgraph 308 received from the planning module 301. For example, the search algorithm can traverse each possible route to the destination using the generated subgraph 308 to determine the difficulty for each of the possible routes, which may involve summing the cost values of the edges for each possible route 208, 210. Since the subgraph 308 only corresponds to the selected partial HD map 200, the search algorithm can add the ETA value for reaching the destination from the lane segment at the end of the subgraph 308 to the route cost values for the currently traversed route 208, 210 to obtain a total ETA value, which can be used to determine the difficulty value. For example, this can include a sum of the subgraph 308 cost value to traverse the subgraph 308 from the current location of the vehicle 105 to a lane segment at the end of the subgraph 308 and the ETA value from the lane segment at the end of the subgraph 308 to the destination (e.g., the global information determined in block 410). Example search algorithms that can be used to traverse the subgraph include the A* algorithm, Dijkstra's algorithm, and/or modified versions thereof.

At block 430, the decision module 304 can generate lane level navigation information based on the possible routes 208, 210 received from the navigation module 302. For example, the decision module 304 can select the route having the lowest difficulty value for navigation. The decision module 304 may also use additional route information based on data from vehicle sensors in selecting one of the possible routes 208, 210 for navigation. Example vehicle sensor data which can be incorporated into the selection of one of the possible routes 208, 210 includes data indicative of the real-time conditions of one or more of the lane segments of the roadway. For example, the real-time conditions can include traffic data (e.g., traffic speed, pedestrian traffic, etc.), route data (e.g., lane closure, construction, etc.), obstacle data (e.g., a fallen tree, objects fallen off of other vehicles in the road, etc.), etc. In one example, the cameras of the vehicle sensor subsystem 144 can identify stopped traffic in an upcoming lane segment of one or more of the possible routes 208, 210. The decision module 304 can use this data to supplement the difficulty values for each of the possible routes 208, 210 received from the navigation module 302 to potentially select a different one of the possible routes 208, 210 to avoid the stopped traffic.

The lane level navigation information generated by the decision module 304 in block 430 can include long term evaluation information and action level information. In some embodiments, the long term evaluation information may include the estimated ETA value for the selected route to the destination and the action level information can include the driving maneuvers required to follow the selected route (e.g., a left lane change in the next 100 m and a right lane change at between 300-500 m ahead). The decision module 304 can provide the lane level navigation information to the vehicle drive subsystem 142 (as shown in FIG. 3) to be acted upon for autonomous navigation of the vehicle. The method ends at block 435.

In a simplified example, there may be two possible routes between the current location of an autonomous vehicle and the destination. As a first example, route A may have a relatively lower ETA value than route B, but route A may also contain a relatively challenging lane change (e.g., a ramp merge to be performed within 50 m in a usually busy traffic). The method 400 may involve selecting route B over route A by weighing the cost value associated with the lane change in route A higher than the relatively shorter ETA value of route A.

In a second example, route A may have a relatively lower ETA value than route B. However, route A may also involve an exit at next ramp. Using vehicle sensors, (e.g., cameras, radar, lidar, etc.), the system can determine that that the ramp along route A is blocked and/or closed. The system can use this information via the method 400 to select route B for further navigation.

As described herein, using the subgraph generated for the partial HD map 200 and updating the cost values for traversing the subgraph based on information obtained using vehicle sensors, the autonomous vehicle 105 can make more informed decisions for lane level navigation. This allows the planning, navigation, and decision modules 301, 302, and 304 to understand the information within the partial HD map 200 and its structure in a comprehensive manner.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A control system for an autonomous vehicle, comprising:
   one or more vehicle sensors arranged on the autonomous vehicle;
   a processor; and
   a computer-readable memory in communication with the processor and having stored thereon computer-executable instructions to cause the processor to:
      receive a high-definition (HD) map that defines a plurality of lane segments that together represent one or more lanes of a roadway, the HD map including at least a current lane segment, and the plurality of lane segments connecting the current lane segment to a destination lane segment,
      select a portion of the HD map as a partial HD map including the current lane segment with a size based at least in part on a range of the one or more vehicle sensors;
      generate auxiliary global information for each of the lane segments in the partial HD map,
      generate a subgraph including a plurality of possible routes between the current lane segment and the destination lane segment using the partial HD map and the auxiliary global information,
      receive data from the one or more vehicle sensors indicative of current conditions of the lane segments,
      identify a lane closure for at least one of the lane segments in the HD map based on the data received from the one or more vehicle sensors,
      select one of the possible routes for navigation based on the auxiliary global information and the identified lane closure, and
      generate lane level navigation information based on the selected route.

2. The control system of claim 1, wherein the memory further has stored thereon computer-executable instructions to cause the processor to:
   generate a plurality of nodes, each of the nodes corresponding to one of the lane segments in the partial HD map,
   generate a plurality of edges, each of the edges connecting a pair of the nodes, and
   determine a cost value for each of the edges based on the auxiliary global information, wherein the cost value is representative of a time to traverse the pair of nodes and/or a difficulty in maneuvering the autonomous vehicle between the pair of nodes.

3. The control system of claim 2, wherein the memory further has stored thereon computer-executable instructions to cause the processor to update the cost value for at least one of the edges based on the data received from the one or more vehicle sensors.

4. The control system of claim 2, further comprising:
   determine a route cost value for each of the possible routes based on a sum of the cost values the edges in the corresponding route,
   wherein the selecting one of the possible routes for navigation comprises using a search algorithm to select the one of the possible routes having a lowest route cost value.

5. The control system of claim 2,
   wherein the subgraph is generated based on the lane segments within the partial HD map and lane segments outside of the partial HD map are excluded from the subgraph.

6. The control system of claim 5, wherein the memory further has stored thereon computer-executable instructions to cause the processor to:
   determine a route cost value for each of the possible routes based on a sum of the cost values for the edges in the corresponding route and the auxiliary global information between an end lane segment of the corresponding route and the destination lane segment.

7. The control system of claim 1, further comprising:
   a vehicle drive subsystem configured to control autonomous navigation of the autonomous vehicle based on the lane level navigation information.

8. The control system of claim 1, wherein the lane level navigation information comprises the auxiliary global information including an estimated time of arrival (ETA) value for the selected one of the possible routes for navigation and driving maneuvers for the autonomous vehicle to follow the selected route.

9. A non-transitory computer readable storage medium having stored thereon instructions that, when executed, cause at least one computing device to:
   receive a high-definition (HD) map that defines a plurality of lane segments that together represent one or more lanes of a roadway, the HD map including at least a current lane segment, and the plurality of lane segments connecting the current lane segment to a destination lane segment;
   select a portion of the HD map as a partial HD map including the current lane segment with a size based at least in part on a range of one or more vehicle sensors arranged on an autonomous vehicle;
   generate auxiliary global information for each of the lane segments in the partial HD map;
   generate a subgraph including a plurality of possible routes between the current lane segment and the destination lane segment using the partial HD map and the auxiliary global information;
   receive data from the one or more vehicle sensors indicative of current conditions of the lane segments;
   identify a lane closure for at least one of the lane segments in the HD map based on the data received from the one or more vehicle sensors;
   select one of the possible routes for navigation based on the auxiliary global information and the identified lane closure; and
   generate lane level navigation information based on the selected route.

10. The non-transitory computer readable storage medium of claim 9, further having stored thereon instructions that, when executed, cause at least one computing device to:
   generate a plurality of nodes, each of the nodes corresponding to one of the lane segments in the partial HD map,
   generate a plurality of edges, each of the edges connecting a pair of the nodes, and determine a cost value for each of the edges based on the auxiliary global information.

11. The non-transitory computer readable storage medium of claim 10, wherein the cost value for each of the edges represents an amount of time involved in driving between the pair of nodes connected to the edge.

12. The non-transitory computer readable storage medium of claim 11, further having stored thereon instructions that, when executed, cause at least one computing device to:
   for each of the edges, determine the amount of time involved in driving between the pair of nodes connected to the edge based on the distance between the pair of nodes and a speed limit associated with the lane segments corresponding to the pair of nodes.

13. The non-transitory computer readable storage medium of claim 10, wherein the cost value for each of the edges represents a difficulty involved in driving between the pair of nodes.

14. The non-transitory computer readable storage medium of claim 13, further having stored thereon instructions that, when executed, cause at least one computing device to:
   determine the difficulty involved in driving between the pair of nodes based on a type of maneuver for traversing the lane segments corresponding to the pair of nodes.

15. The non-transitory computer readable storage medium of claim 14, wherein the type of maneuver comprises at least one of the following: a lane change, a merge, a lane split, and traversing an intersection.

16. The non-transitory computer readable storage medium of claim 13, further having stored thereon instructions that, when executed, cause at least one computing device to:
   determine a difficulty value for each of the possible routes between the current lane segment and the destination lane segment based on the difficulty involved in driving between the pair of nodes for the edges in each of the possible routes,
   wherein the selection of one of the possible routes for navigation is further based on the difficulty values.

17. A method for generate lane level navigation information for autonomous navigation, comprising:
   receiving a high-definition (HD) map that defines a plurality of lane segments that together represent one or more lanes of a roadway, the HD map including at least a current lane segment and a destination lane segment;
   selecting a portion of the HD map as a partial HD map including the current lane segment with a size based at least in part on a range of one or more vehicle sensors arranged on an autonomous vehicle;
   generate auxiliary global information for each of the lane segments in the partial HD map;
   generating a subgraph including a plurality of possible routes between the current lane segment and the destination lane segment using the partial HD map the auxiliary global information;
   receiving data from the one or more vehicle sensors indicative of current conditions of the lane segments;
   identifying a lane closure for at least one of the lane segments in the HD map based on the data received from the one or more vehicle sensors;
   selecting one of the possible routes for navigation based on the auxiliary global information and the identified lane closure; and
   generating lane level navigation information based on the selected route.

18. The method of claim 17, further comprising:
   traversing the subgraph using a search algorithm to determine a cost value for each of the possible routes,
   wherein the selecting one of the possible routes for navigation comprises selecting the one of the possible routes having a lowest associated cost value.

19. The method of claim 18, wherein the search algorithm comprises an A* algorithm or a modified version of the A* algorithm.

20. The method of claim 18, wherein the search algorithm comprises Dijkstra's algorithm or a modified version of the Dijkstra's algorithm.

* * * * *